Feb. 22, 1966 D. C. EVANS 3,237,164

DIGITAL COMMUNICATION SYSTEM FOR TRANSFERRING DIGITAL INFORMATION BETWEEN A PLURALITY OF DATA PROCESSING DEVICES

Filed June 29, 1962

3 Sheets-Sheet 1

DAVID C. EVANS
*INVENTOR.*

BY Byard G. Nilsson

DAVID C. EVANS
INVENTOR.

BY Byard G. Nilsson

Feb. 22, 1966 D. C. EVANS 3,237,164

DIGITAL COMMUNICATION SYSTEM FOR TRANSFERRING DIGITAL INFORMATION BETWEEN A PLURALITY OF DATA PROCESSING DEVICES

Filed June 29, 1962 3 Sheets-Sheet 3

DAVID C. EVANS
INVENTOR.

BY Byard G. Nilsson

United States Patent Office 3,237,164
Patented Feb. 22, 1966

3,237,164

DIGITAL COMMUNICATION SYSTEM FOR TRANSFERRING DIGITAL INFORMATION BETWEEN A PLURALITY OF DATA PROCESSING DEVICES

David C. Evans, Playa Del Rey, Calif., assignor, by mesne assignments, to Control Data Corporation, Minneapolis, Minn., a corporation of Minnesota Filed June 29, 1962, Ser. No. 206,461
5 Claims. (Cl. 340—147)

The present invention relates to a digital communication system, for interconnecting a plurality of data-processing devices, which may employ parallel electrical signals.

With the growth and development of the data-processing art, the need for system flexibility has continually increased. At present, the various applications for computers and data-processing equipment, has resulted in a need for many different types of systems. In general, the cost to manufacture custom equipment for all the various installations is prohibitive. Therefore, flexibility has usually been obtained by manufacturing a basic computer, along with a number of accessories which can be associated with the computer and thus provide the desired end system. For example, a system employed primarily for commercial use may include a computer associated with punch-card equipment, and magnetic-tape apparatus. In an installation to be used primarily for processing scientific data, the desired system may include: a basic computer, a graph plotter, magnetic-tape apparatus, and perhaps a digital differential analyzer.

Many different combinations can be employed in various applications. However, in general, the number and type of accessory units (or other data-processing devices) which can be coupled to a computer, has been dependent upon the basic design of the computer and the practical extent of modification. For example, a computer designed to operate with a punch-paper tape unit, a magnetic-tape unit, various punch-card equipment and an external memory, may require considerable modification to operate with a graph plotter. Furthermore, upon making the apparently-necessary modifications, additional difficulties are sometimes encountered with such problems as impedance matching between units.

In general, the present invention relates to a digital communication system for interconnecting a plurality of data-processing devices to transfer signal information between the devices. The system includes a cable comprising a plurality of twisted pairs of conductors each of which serves to carry one of a group of parallel digital signals. A plurality of coupling devices are then provided to connect the data-processing devices to the cable. The coupling devices are essentially connected to the cable in parallel and serve to regulate the use of the cable as a party line by the various data-processing devices. The use of a cable is controlled by the transmission of instructions which are carried by the cable to the coupling devices. As employed herein, the term "instructions" applies to signal-represented instructions for the coupling devices per se, all other signal-represented information being considered "data."

An object of the present invention is to provide an improved digital communication system which permits the interconnection of various data-processing devices.

This and other objects of the invention will become apparent from a consideration of the following specification, taken in conjunction with the appended drawings, in which.

Figure 1:
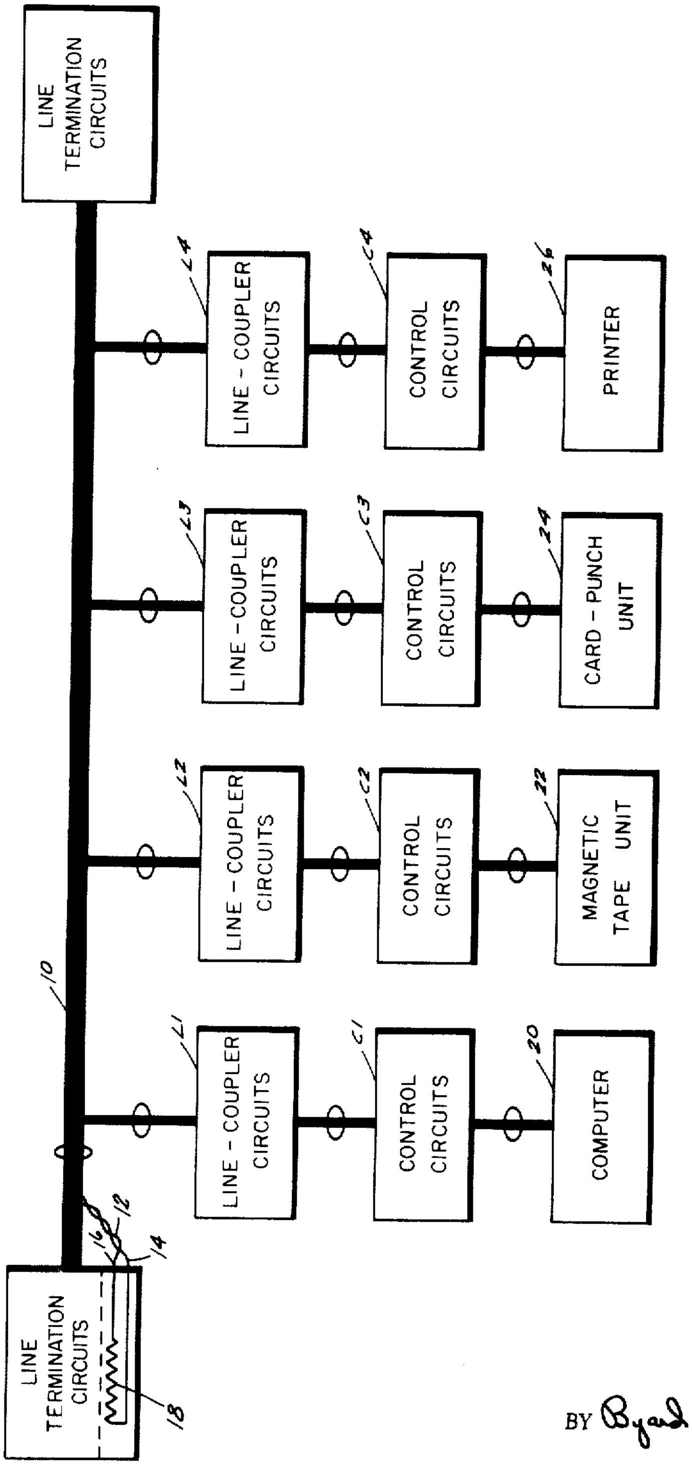
FIG. 1 is a block diagram of a system incorporating the present invention.

Referring now to FIG. 1, there is shown a cable 10 which includes a plurality of communication lines, e.g. line 12. Each of the communication lines in the cable 10 comprises a pair of twisted wires, e.g. wires 14 and 16, which are terminated at the ends of the cable 10 in a resistor 18 having a value equal the characteristic surge impedance of the pair, so as to combat reflections from the terminaiton. The resistor 18, as shown in FIG. 1 is connected across conductors 14 and 16, to illustrate the similar termination of each of the lines in the cable 10.

The cable 10 contains one line for every binary digit carried. That is, each binary signal in the cable 10 is carried in a separate line. In one exemplary form of the present invention, the cable 10 includes eighteen lines. Eight of the lines are employed to carry binary-coded information, another line is employed to distinguish data from instructions, six lines are employed as auxiliary lines for private communication, and the remaining three lines are employed for various special purposes as, parity signals. Of course, depending upon the installation, and the various types of data-processing devices which are to be interconnected by the system, different numbers of lines may be utilized in the cable 10.

In FIG. 1, line-coupler circuits L1, L2, L3, and L4 are connected in parallel to the cable 10. The details of the line-coupler circuits will be considered below; however, it is to be noted that these circuits couple electrical pulses from the lines in the cable 10 to associated control circuits C1, C2, C3, and C4. The control circuits in turn selectively apply data to the data-processing units with which they are associated, under control of instructions carried by the cable 10. The control circuits C1, C2, C3, and C4 also serve to control the flow of data from the data-processing units to the line 10.

The data-processing units shown in FIG. 1 include a computer 20, a magnetic-tape unit 22, a card-punch unit 24 and a printer 26. Of course, these units are merely illustrative, and any form of digital data-processing units could be employed. However, it is to be noted that the present system employs parallel binary digital signals; therefore, if a serial data-processing device is employed, a buffer stage must be interconnected between the units and the control circuits.

Considering the operation of the system of FIG. 1 in general, the computer 20, serving as the master control, issues instructions which are selectively accepted by the control circuits associated with the other units. These control circuits are thus set to enable an associated unit to: receive data, acknowledge receipt of data, act as the control unit, transmit data, and so on. In commanding the data-processing units to perform these functions, the computer 20 (or other units acting in a control capacity) issues instructions which are passed through the party lines of the cable 10. The instructions are coded to be recognized by selected control circuits so that the control circuits are set to control the flow of signals between the associated unit and the cable 10 in accordance with received instructions.

In addition to the party lines in the cable 10, which carry binary coded information, data-instruction bit, and parity bits, a group of additional auxiliary lines, are provided. The auxiliary lines are private communication lines and may be variously interconnected between the data-processing devices in accordance with selected programs. For example, upon the occurrence of a predetermined event, an auxiliary line may be employed to command the removal of a data-processing unit from the party line. Considering a simple illustrative example, the computer 20 may issue an instruction to the control circuits C3 causing the punch-card unit 24 to transmit data. Next, the computer may issue a command to the control circuits C4 to cause the printer 26 to receive (and print) data from the cable 10. Thereafter, the punch card unit transfers data through the cable 10, which is printed by the printer 26; however, an auxiliary line from the cable 10 may be employed to halt the transfer of data if the printer runs out of paper. In this manner, the auxiliary lines are employed to override or supplement the instructions which are issued on the main party lines.

Figure 2:
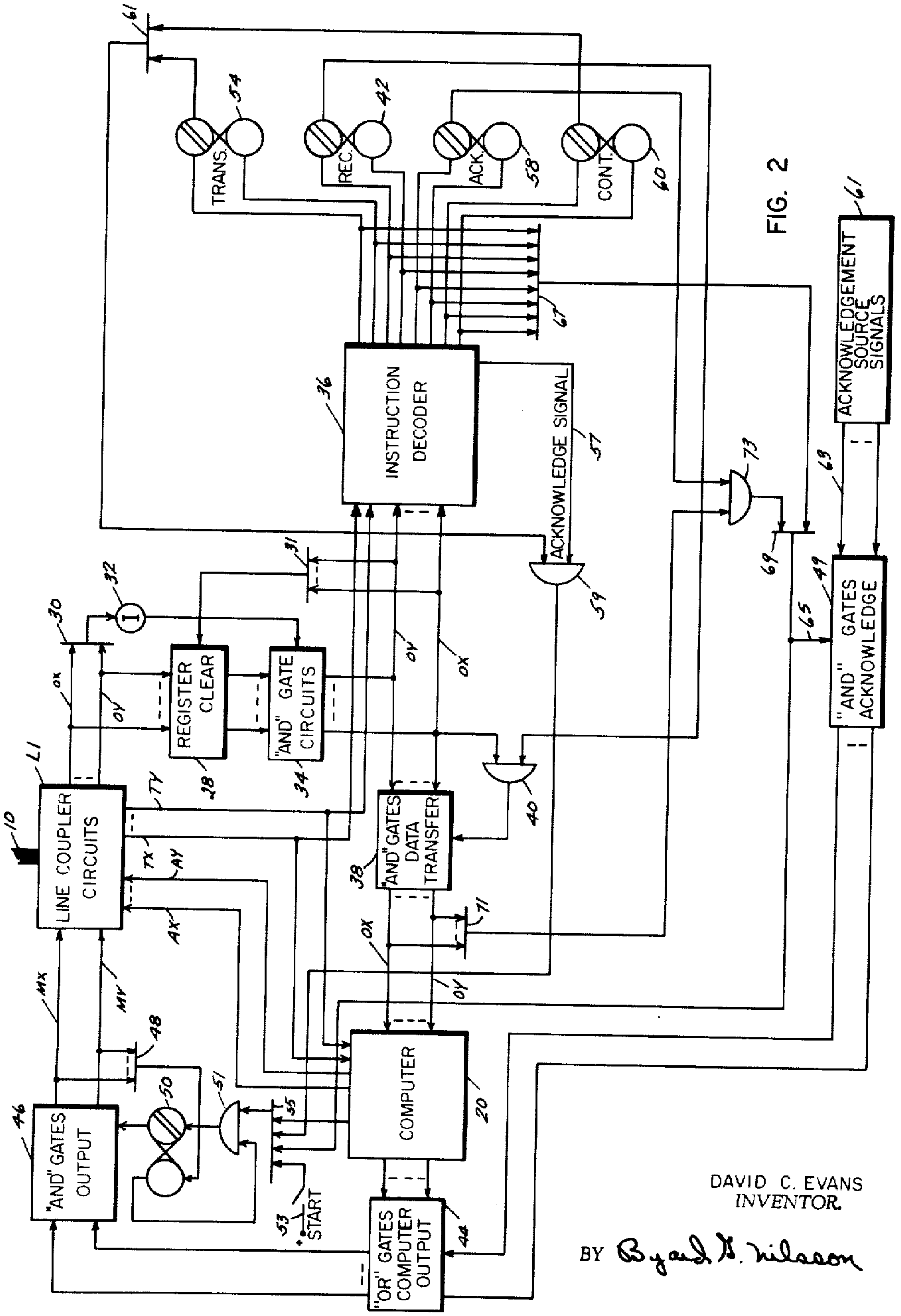
FIG. 2 is a block diagram of a portion of FIG. 1 shown in detail.

In view of this cursory consideration of the operation of the system, reference will now be had to FIG. 2 which shows the line coupler circuit L1 and the computer 20, in block form, and the associated control circuits C2 in operating detail.

In considering FIG. 2, it will be apparent that the control circuit C1 is similar in structure to the other control circuits; therefore, these circuits are not individually described in detail.

The line coupler L1 is connected to the cable 10 and to a series of input lines and output lines. The details of the line coupler circuits will be considered below with reference to FIG. 3; however, in function, the line coupler circuits connect each of the lines (as line 12) to an input conductor and an output conductor. Of course, the number of these conductors provided depends upon the demands of the system. In FIG. 2 the input lines to the line-coupler circuits L1 are designated MX through MY and AX through AY. The conductors MX through MY are main-line conductors and, therefore, function as a party line. The conductors AX through AY are auxiliary line conductors and are employed as private communication lines.

The output from the line coupler circuit L1 is provided on main line conductors OX through OY and on auxiliary line conductors TX through TY. The auxiliary output lines TX through TY are connected directly to the computer 20 and may be variously connected in the system for private communication. The conductors OX through OY are connected to a binary register 28 comprising a number of binary stages coinciding to the number of conductors OX through OY. The register 28 is cleared as shown in the drawing through an "or" gate 31 when the transfer from the register is complete. The conductors OX through OY are also connected through an "or" gate 30, and an inverter 32 to a series of "and" gates 34. Various detail structures for "or" gates, inverters and "and" gates, are well known in the prior art. In function, an "or" gate passes the high state of any of a plurality of two-state input signals. The function of an inverter circuit is to invert or reverse the state of an applied two-state signal. The function of an "and" gate is to provide the high state of a two-state signal, only if all the input signals are in a high state.

The group of "and" gates 34 are each individually connected to receive one input from a stage in the register 28, and another input from the inverter 32. Therefore, digital signals carried in the lines OX through OY are registered in the register 28, and applied to the inverter 32. Then, when the last of these signals is registered, the input to the inverter 32 goes low providing the output high to qualify the gates 34, enabling these gates to simultaneously pass the contents of the register 28 to an instruction decoder 36, and data transfer gates 38.

The decoder 36 may comprise a logic network of diodes as set forth below, which functions to pass a high signal to a selected one of a plurality of output lines, upon receiving a coded instruction from the gates 34.

The outputs from the gates 34 are individually applied to the group of data-transfer "and" gates 38 (represented by a single block) which are each individually connected to receive one input from one of the gates 34 and another input from an "and" gate 40, qualified as described below. The outputs from these gates are applied to the computer 20.

The parallel digital signals received in the lines OX through OY may comprise either instructions (for the control circuits) or data (for the computer 20) therefore, these signals carry a marker or flag to indicate their nature. Specifically, the most-significant digit signal in the conductor OX indicates whether the parallel signals received represent data or an instruction. The high state of the signal in conductor OX indicates that the signals represent data. Conversely, if the signal in the conductor OX is low, an instruction is represented.

Upon the occurrence of signals representing data for the computer 20, the "and" gate 40 is qualified by a high signal in the conductor OX, and a signal from a flip-flop 42 (which is high when the computer 20 is to receive data as described below). Thereupon, the data transfer "and" gates 38 are qualified and the parallel binary signals are applied to the main input of the computer 20. Thus, information signals from the cable 10 are applied through the line coupler circuits L1, the register 28, the gates 34, and the gates 38 to the computer 20.

If the signals from the gates 34, in the lines OX through OY is an "instruction" rather than data the binary signal in the line OX is low, whereupon the instruction decoder 36 operates to execute the instruction by controlling a group of flip-flops to thereby establish the coming pattern of operation of the system. That is, the state of the flip-flops determines whether or not the associated data processing unit (e.g. the computer) shall receive data, etc. These flip-flops are considered in detail hereafter; however, first, brief reference will be made to the operation of supplying signals from the computer 20 to the cable 10.

Two separate groups of conductors are provided for transferring data to the cable 10. The auxiliary output conductors AX through AY are connected directly from the computer 20 to the line-coupler circuit L1. The main output conductors MX through MY are connected from the computer through a series of "or" gates 44 and a group of "and" gates 46, to the line coupler circuits L1. The gates 44 also receive signals from a series of gates 49 to acknowledge receipt of the last transmission as will be decribed in detail below. However, it should be understood that the gates 44 pass all received signals to the gates 46.

The "and" gates 46 are qualified to pass a set of received binary signals when a flip-flop 50 is in a set state. The flip-flop 50 is placed in a reset state after the gates 46 pass a signal. This operation is accomplished by an "or" gate 48 which receives an input from all the output lines of the gate 46. Therefore upon passage of any signals, the output from the "or" gate 48 becomes high and resets the flip-flop 50.

The flip-flop 50 is set to permit the gates 46 to pass signals, upon the qualification of a single "and" gate 51, which occurs when the flip-flop 50 is reset and a transmission to the cable 10 should occur. The indication that the flip-flop 50 is reset is provided to the gate 51 by a direct connection to the flip-flop. The indication that a transmission should occur may be derived from several sources. First, a switch 53 may be closed to provide a high signal to an "or" gate 55, the output of which is applied to qualify the "and" gate 51. This means may be employed to set the flip-flop 50 manually.

Each unit in the system must wait until the last signals transmitted have been acknowledged to have been received before another set of signals can be transmitted. The receipt of an acknowledgement signal is manifest by a high signal in a conductor 57 from the instruction decoder which identifies the acknowledgement signal. This signal in the conductor 57 is applied to an "and" gate 59 along a signal from an "or" gate 61 which is high when the unit of FIG. 2 is acting either as a transmitter or a control apparatus, as manifest by the transmit flip-flop 54 or the control flip-flop 60 being set.

The qualification of the gate 59 therefore indicates the computer 20 is either in control (sending instructions) or is transmitting (sending data) and that the last transmission was acknowledged. As a result of the qualification of the gate 59, a high signal is passed through the gates 55 and 51 to set the flip-flop 50 thereby qualifying the gates 46 to permit another transmission.

When the computer 20 has relinquished control to another data processing unit it may receive instructions and data, and must acknowledge such on receipt. Acknowledgement signals comprising a binary code group, e.g. 00111110, are provided by a source 61 which may simply be a binary register set to manifest the acknowledgement signals in conductors 63. These signals are provided to "and" gates 49 which pass the signals only if a high signal is received from a conductor 65. Of course, if the "and" gates 49 are so qualified, the acknowledgement signals are passed through gates 44 and 46 to be applied to the cable 10, as the conductor 65 is also applied to gate 51 through the "or" gate 55.

The computer 20 and associated control circuits of FIG. 2 should acknowledge either upon receiving an "instruction," or upon receiving "data" when the unit has been set to respond with an acknowledgement. The receipt of an "instruction" by the unit is detected by an "or" gate 67 which receives inputs from all the flip-flop control conductors from the decoder 36. Thus, upon receipt of an "instruction" the gate 67 passes a high signal through an "or" gate 69 to the conductor 65.

The receipt of "data" by the apparatus is sensed by an "or" gate 71 which is connected to all the output lines OY through OX from the data-transfer gates 38. The occurrence of data signals in these lines therefore produces a high signal from the gate 71 which is applied to an "and" gate 73. Another input to the gate 73 is provided from the "acknowledge" flip-flop 58, providing a high signal when the apparatus is to acknowledge. Therefore, upon receipt of data signals and when set to acknowledge, the gate 73 in the control circuits is qualified to pass a high signal to the conductor 65.

Considering the mode flip-flops 42, 54, 58 and 60, these flip-flops are variously set or reset to indicate the communication mode of the computer 20. For example, if the computer is to transmit information to the cable 10, the "transmit" flip-flop 54 is set. The set state of the "receive" flip-flop 42 indicates the computer is to receive signals, and the set state of the "acknowledgement" flip-flop 58 further indicates the computer shall acknowledge for received signals. The set state of the "control" flip-flop 60 indicates the computer is in control of the entire system.

The flip-flops which determine the state of operation of the various coupling circuits are controlled by the associated instruction decoder 36 acting in accordance with coded instructions received from the cable 10. For example, if eight main lines are employed, the input lines to the instruction decoder 36 may be constructed to decode commands in accordance with the following logic chart:

| | |
|---|---|
| 00000000 | Clear |
| 00000010 | Computer transmit |
| 00000100 | Computer receive |
| 00000110 | Computer acknowledge |
| 00001000 | Computer control |
| 00001010 | Magnetic tape unit transmit |
| 00001100 | Magnetic tape unit receive |
| 00001110 | Magnetic tape unit acknowledge |
| 00010000 | Magnetic tape unit control |
| 00010010 | Punch card unit transmit |
| 00010100 | Punch card unit receive |
| 00010110 | Punch card unit acknowledge |
| 00011000 | Punch card unit control |
| 00011010 | Printer receive |
| 00111110 | Acknowledgement |
| 01000000 | Ready for information |

Of course, a variety of other instructions may be employed in the system; however, those set out above indicate, in general, the mode of operation for the present system.

The instruction decoder, which may comprise various logic circuits is constructed according to the above chart to control the flip-flops 42, 54, 58 and 60 by providing an output signal to the flip-flop circuits. For example, upon the occurrence of a "clear" instruction, the flip-flop circuits coinciding to the flip-flops 42, 54, 58 and 60 in the control circuits C2, C3, C4, are all reset; however, in the control circuit C1, the flip-flop circuits 42, 54 and 58 are reset while the "control" flip-flop 60 is set so that the computer is in control. Each of the instruction decoders in the entire system thus performs different logic operations to thereby set the controlling flip-flops and to recognize and accept or reject various instructions as they relate to the associated data-processing device.

In view of the above description, the illustrative system of the present invention may now best be considered by explaining a series of exemplary operations. Assume that the system of FIG. 1 is to perform the relatively-simple operation of computing the payroll of a number of hourly employees. In general, the static information (rate-of-pay, dependents, etc.) for each employee is registered on magnetic tape, and identified by a code or a serial number. The variable information (hours of work, overtime, etc.) for each employee is provided from punch cards. The computation from this information to determine the amount of money due each employee is performed by the computer 20 and provided by the printer 26.

In general, the program may operate by the punch-card unit (FIG. 1) providing the employee's serial number to the magnetic tape unit 22 and to the computer 20. The magnetic tape unit 22 then searches for the employee's static data, while the punch-card unit 24 provides the variable information to the computer 20. When the magnetic-tape unit 22 locates the employee's variable information, the transfer of information from the punch-card unit 24 to the computer 20 is halted while the magnetic tape unit transfers information to the computer 20. Thereafter (unless previously complete) the transfer of data from the punch-card unit 24 to the computer is resumed.

Upon receiving all the data, the computer proceeds to compute the payroll information which is then transferred to the printer 26 to present the result as a payroll check ready for signature.

The following program defines the operation of the system of the present invention to accomplish the data transfers described above.

| Instruction | Source | Destination | Command |
|---|---|---|---|
| 00000000 | Computer | All units | Reset. |
| 00111110 | All units | Computer | Acknowledgement. |
| 00010010 | Computer | Card Unit | Transmit. |
| 00111110 | Card Unit | Computer | Acknowledgement. |
| 00000100 | Computer | do | Receive. |
| 00111110 | do | do | Acknowledgement. |
| 00000110 | do | do | Acknowledge. |
| 00111110 | do | do | Acknowledgement. |
| 00001100 | do | Tape Unit | Receive. |
| 00111110 | Tape Unit | Computer | Acknowledgement. |
| 01000000 | Computer | Card Unit | Send Information. |

INFORMATION TRANSFER (EMPLOYEE'S NUMBER)

By auxiliary-line, the computer next commands the tape unit to receive no further information through the party line and to search for information designated by the received code.

| | | | |
|---|---|---|---|
| 00111110 | Computer | Card Unit | Acknowledgement. |

INFORMATION TRANSFER (EMPLOYEE'S VARIABLE INFORMATION)

By auxiliary line the tape unit indicates it has located the employee's static data.

| | | | |
|---|---|---|---|
| 00000000 | Computer | All Units | Reset. |
| 00111110 | All Units | Computer | Acknowledgement. |
| 00000100 | Computer | do | Receive. |
| 00111110 | do | do | Acknowledgement. |
| 00000110 | do | do | Acknowledge. |
| 00111110 | do | do | Acknowledfement. |
| 00001010 | do | Tape Unit | Transmit. |
| 00111110 | Tape Unit | Computer | Acknowledgement. |
| 01000000 | Computer | Tape Unit | Send Information. |

INFORMATION TRANSFER (EMPLOYEE'S STATIC INFORMATION)

| | | | |
|---|---|---|---|
| 00111110 | Computer | Tape Unit | Acknowledgement. |
| 00000000 | do | All Units | Reset. |

Applying the above program to the elements of FIG. 2, the computer 20 is initially placed in command ordered by the switch 53 to issue a "reset" or clear instruction through the gates 46 and the line-coupler circuits L1. This instruction (in the form of digital signals 00000000) clears the system and maintains the computer in control. Therefore, all the flip-flops in the system, as 42, 54, 58 and 60 are reset except the flip-flop 60 associated with the computer 20 as shown in FIG. 2.

Following receipt of an acknowledgement, the computer next issues an instruction (00010010) which sets the control circuit C3 associated with the card unit 24 (FIG. 1) to a "transmit" state. The path of this instruction may be seen in FIG. 2 assuming the control circuits therein to be associated with the card unit 24 rather than the computer 20. From the line coupler circuits L1, the signals pass to the register 28. When all the signals in the input conductors OX through OY to the register, become low, the output from the inverter 32 becomes high, qualifying the gates 34 to pass the signals to the instruction decoder 36 and the gates 38. These signals clear the register 28 through the gate 31.

The most-significant digit of the "instruction" identifies it and is a low signal to inhibit the gate 40 isolating the "instruction" from the computer. However, the "instruction" is detected by the decoder 36, which provides a high output signal to set the "transmit" flip-flop 54. This signal also passes through the gates 67 and 69 to qualify the gates 49 and 46 with the result that acknowledgement signals are applied on the cable 10 from the source 61.

Next, the control circuit C1 is set to "receive" and "acknowledge" and control circuit C2 is set to "receive." These operations are performed by the computer issuing the necessary coded instructions set forth above with each followed by an acknowledgement as described.

The punch-card unit 24 is now prepared to transmit information (from cards) to the computer 20 and the magnetic tape unit 22. The first information sent from a card gives the employee's identification number. Signals indicative of this number in the cable 10, are received on conductors OX through OY (FIG. 2) from the line coupler circuits associated with the computer and the tape unit. The signals are placed in the register 28 (in control circuits C1 and C2) and upon registration of the last signal, the inverter 32 (FIG. 2) provides a high output which gates the signals from the register 28 through the gates 34 to the instruction decoder 36 and the data gates 38 to the computer. A similar transfer is accomplished in the control circuits C2.

The data-representing nature of the signals from the register 28 (most-significant digit in line OX being a "one") is recognized by the data-transfer gates 38 in conjunction with the gate 40, to pass the signals to the inputs of computer 20. This transfer is conditioned upon the qualification of the gate 40 by the flip-flop 42 indicating that the computer is to receive data.

Upon the registration of these data signals in the computer 20, a signal is sent via one of the private-line conductors AX through AY, through the cable 10 to the magnetic-tape unit 22. The receipt of this signal by the tape unit, causes the tape unit to go "off line" by resetting the "receive" flip-flop. The tape unit then proceeds to search for the employee's block of static data which is identified by the previously-received data signals.

The computer 20 now transmits an "acknowledgement" signal through the gates 44 and 46, which is received by the punch-card unit, commanding the punch-card unit to transmit another data word. This operation cycle of data word-acknowledgement continues either until the employee's variable information is completely transmitted to the computer or until the magnetic-tape unit 22 locates the employee's serial number.

When the employee's block of static data is located by the tape unit 22, it transmits an "interrupt" signal to the computer 20 via an auxiliary line. The computer then transmits a "clear" signal resetting the system, followed by a signal to enable the tape unit 22 to transmit. The desired static data is then transmitted to the computer through the cable 10 as indicated above, with each block of information being followed by a response or "acknowledgement" signal from the computer.

In this manner, the system continues to function by the controlled cooperation of the data-processing units interconnected by the cable 10 and the separate control circuits. Thus a variety of different data-processing units may be simply and flexibly interconnected. Furthermore, the flow of information between the units is continually regulated in accordance with instructions issued from a command source which may be any of the units.

The interconnection of data-processing units as described above may be simply and easily accomplished by merely providing a number of receptacles along the cable 10 and utilizing various plug-in units from the line coupler circuits.

Figure 3:
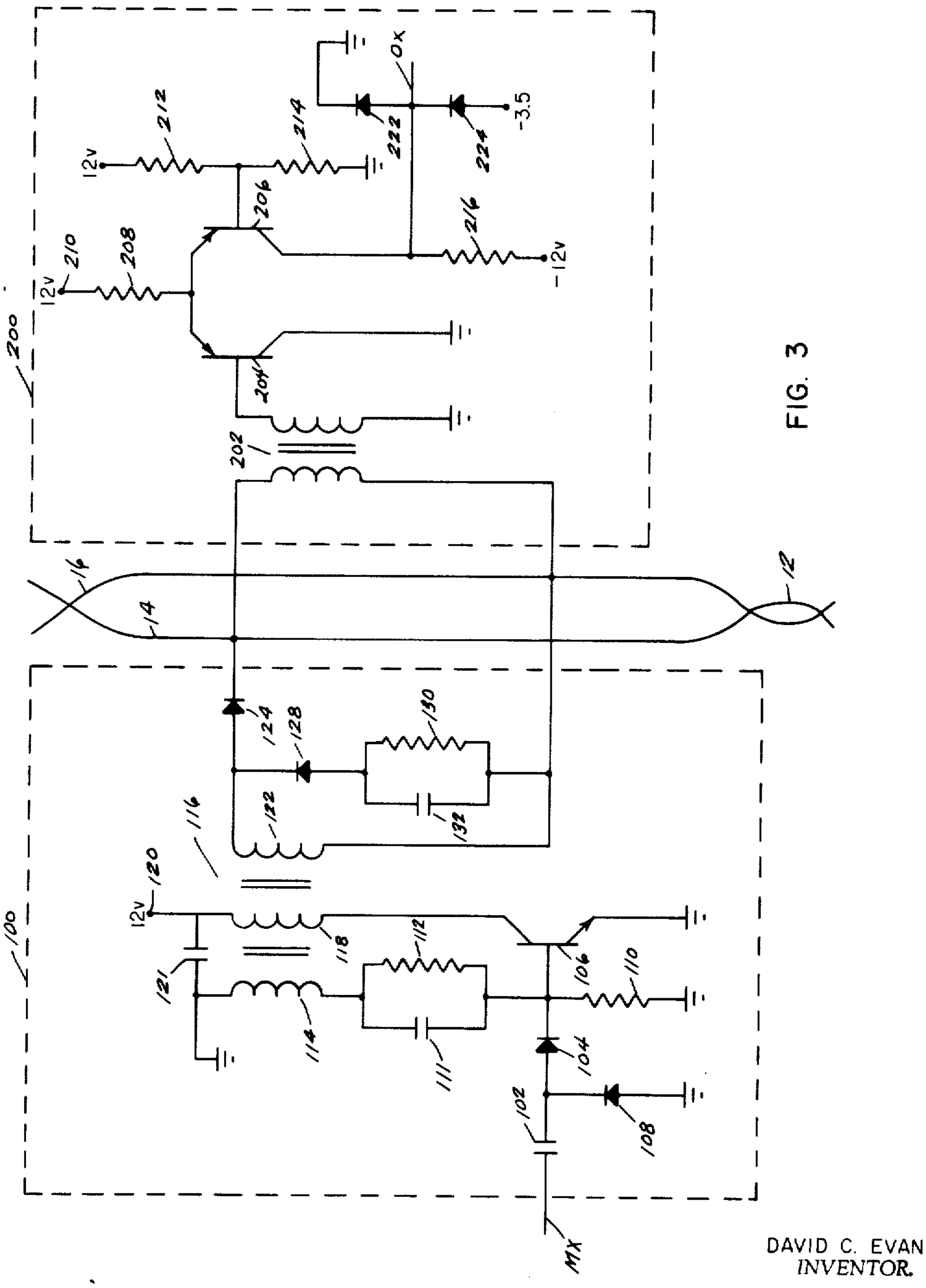
FIG. 3 is a circuit diagram showing one of the elements of the system of FIG. 2 in detail.

Considering the details of the line-coupler circuits, reference will now be had to FIG. 3 which shows the coupler-circuit for a single line e.g. line 12 coupled to conductors MX and OX. The line coupler circuit includes a driver 100 and a receiver 200. The driver 100 is connected to the control circuits, and receives a pulse on a conductor MX which is connected through a capacitor 102 and a diode 104 to the base of a transistor 106. The junction point between the capacitor 102 and diode 104 is connected through a diode 108 to ground. Similarly, the junction point between the diode 104 and the transistor 106 is connected through a resistor 110 to ground. This junction point is also connected through a parallel circuit including a capacitor 111 and a resistor 112, which circuit is serially connected through a winding 114 to ground. The winding 114 is in a transformer 116, with windings 118 and 122. The winding 118 is connected between a source of positive potential, applied at terminal 120, and the collector electrode of the transistor 106. The terminal 120 is also connected by a capacitor 121 to ground, along with the emitter electrode of the transistor 106.

The third winding 122 of the transformer 116 is connected in series with a diode 124 across the line 12. A circuit 126, comprising a diode 128 serially connected with a parallel-connected resistor 130 and capacitor 132 is connected across the winding 122.

Essentially, the line driver 100 is a blocking oscillator and upon receiving a positive pulse from the input conductor MX, the base of the transistor 106 is driven positively resulting in increased current through the winding 118 of the transformer 116. This increase in current is reflected through the winding 114 to further drive the base of the transistor 106 positively so as to effect a regenerative action. This action continues until the charge on the capacitor 111 builds up to halt further increase. At that instant, the voltage across the base winding 114 reverses and a regenerative turnoff occurs.

At the end of the pulse, the flux in the transformer 116 must be dissipated and this dissipation occurs through the network 126. This network 126 also tends to prevent the transformer from driving the base of the transistor 106 positive during the recovery. Thus, the current through the winding 118 is rapidly increased and decreased inducing a voltage in the winding 122 to create a potential difference across the conductors 14 and 16 which is sensed at all receiver units.

Considering the line receiver 200, upon the occurrence of a voltage difference across the conductors 14 and 16, a pulse is coupled through a transformer 202 to a transistor 204. The collector of the transistor 204 is coupled to ground and the emitter is connected to the emitter of a transistor 206, and through a resistor 208 to a source of positive potential applied at a terminal 210. The base of the transistor 206 is connected to a voltage-divider network including resistors 212 and 214. The collector electrode of a transistor 206 is connected through a resistor 216 to a source of negative potential and the junction point between the transistor 206 and the resistor 216 is connected to an output line OX which is clamped by diodes 222 and 224.

In the operation of this system, the base of the transistor 206 is held at a low voltage by the resistors 212 and 214. As the base of the transistor 206 is essentially grounded at this time, the voltage at the junction of the two emitters is slightly less than the voltage at the collector of the transistor 206, therefore, the transistor 204 is cut off. Upon receiving the pulse from the line, a positive voltage is applied to the base of the transistor 204, driving emitter voltage up until it is clamped by the base voltage of the transistor 206. Next, the current through the resistor 208 is switched from the transistor 204 to flow through the transistor 206. As a result, the voltage at the output terminal 220 raises to a level clamped by the diode 224, providing an input pulse to the conductor OX.

It may, therefore, be seen that the coupling networks as shown in FIG. 3 connect individual conductors to the lines in the cable 10. Thus signals are transmitted from one unit to another or alternatively a unit may transmit data to itself through the digital communication system.

An important feature of the present invention resides in a digital communication system wherein data and instructions both flow over the same lines, and wherein the instructions serve to variously condition the associated devices for receiving and transmitting data.

It should be noted that although the particular embodiment of the invention herein described is fully capable of providing the features and achieving the objects set forth, such embodiments are merely illustrative and this invention is not to be limited to the details of construction illustrated and described herein, except as defined by the appended claims.

What is claimed is:

1. A digital communications system for transferring information represented by digital data signals between a plurality of data-processing devices, in accordance with instructions represented by digital instruction signals, comprising:

acknowledgement means for each of said data processing devices for providing an acknowledgement signal;

control register means for each of said data-processing devices, each for controlling the operation of one of said data-processing devices and one of said acknowledgement means for said one data-processing device;

decoding means for each of said data-processing devices for selectively registering signals in said control register means for each of said data processing devices in accordance with said instruction signals received;

connector means including plural signal paths for providing common parallel signal interconnection between each of said data-processing devices; said control means; said decoding means and said acknowledgement means; and means for providing signals to said connector means conditioned upon the occurrence of an acknowledgement signal which signals may comprise said data signals or said digital information signals.

2. A digital communications system for transferring information represented by digital data signals between a plurality of data-processing devices, in accordance with instructions represented by digital instruction signals, comprising:

acknowledgement means for each of said data processing devices for providing an acknowledgement signal;

control register means for each of said data-processing devices, each for controlling the operation of one of said data-processing devices and one of said acknowledgement means for said one data-processing device;

decoding means for each of said data-processing devices connected to one of said data-processing devices and to the one control devices, said decoding means for selectively registering signals in said one control register means in accordance with received instruction signals and for selectively applying data signals to said one data processing device in accordance with signals registered in said one control register means;

connector means including plural signal paths for providing common parallel signal interconnection between each of said decoding means and said acknowledgement means; and means for providing signals to said connector means conditioned upon the occurrence of an acknowledgement signal which signals may comprise said data signals or said digital information signals.

3. A communications system according to claim 2 wherein said connector means comprises a plurality of pairs of signal lines; termination means for each of said pairs of signal lines to terminate each of said pairs of lines in the characteristic impedance thereof, and transformer coupling means for each of said decoding means for coupling said decoding means to said pairs of signal lines.

4. A digital communications system for transferring information represented by digital data signals between a plurality of data-processing devices, in accordance with instructions represented by digital instruction signals, comprising:

acknowledgement means for each of said data-processing devices for providing an acknowledgement signal;

control register means for each of said data-processing devices, each for controlling the operation of one of said data-processing devices and one of said acknowledgement means for said one data-processing device;

decoding means for each of said data-processing devices connected to one of said data-processing devices and to the one control register means for said one of said data processing devices, said decoding means for selectively registering signals in said one control register means in accordance with received instruction signals and for selectively applying data signals to said one data processing device in accordance with signals registered in said one control register means;

connector means including plural signal paths for providing common parallel signal interconnection between each of said decoding means and said acknowledgement means; and a plurality of output circuit means for certain ones of said data-processing devices coupled to said connector means and said certain ones of said data-processing devices, operative in accordance with said control register means for said certain ones of said data-processing devices to provide data signals and instruction signals to said connector means conditioned upon the occurrence of an acknowledgement signal.

5. A digital communications system for transferring information represented by digital data signals between a plurality of data-processing devices, in accordance with instructions represented by digital instruction signals, comprising:

control register means for each of said data-processing devices for controlling the operation thereof in accordance with registered signals in said control register means;

decoding means for each of said data-processing devices connected to one of said data-processing devices and to the one control register means for said one of said data-processing devices, said decoding means for selectively registering signals in said one control register means in accordance with received instruction signals and for selectively applying data signals to said one data processing device in accordance with signals registered in said one control register means;

connector means for providing parallel signal interconnection between each of said decoding means and including a plurality of pairs of signal lines, termination means for each of said pairs of signal lines to terminate each of said pairs of lines in the characteristic impedance thereof, and transformer coupling means for each of said decoding means for coupling said decoding means to said pairs of signal lines; and means for providing signals to said connector means which signals may comprise said data signals or said digital information signals.

References Cited by the Examiner

UNITED STATES PATENTS

| | | | |
|---|---|---|---|
| 2,009,438 | 7/1935 | Dudley | 333—8 X |
| 2,054,799 | 9/1936 | Kautter | 333—8 X |
| 2,497,784 | 2/1950 | Mehan et al. | 340—147 X |
| 2,615,629 | 10/1952 | Dayger et al. | 235—61.9 |
| 2,874,220 | 2/1959 | Cox. | |
| 2,883,521 | 4/1959 | Curry | 340—163 X |
| 2,946,986 | 7/1960 | Harrison | 340—152 X |
| 3,046,525 | 7/1962 | Deming et al. | 340—163 |
| 3,061,192 | 10/1962 | Terzian | 340—172.5 X |
| 3,099,818 | 7/1963 | Murray | 340—172.5 |

OTHER REFERENCES

IBM Technical Disclosure Bulletin, vol. 2, No. 6, April 1960, pp. 29–30.

NEIL C. READ, *Primary Examiner.*